United States Patent [19]
Wilczek et al.

[11] Patent Number: 5,344,592
[45] Date of Patent: Sep. 6, 1994

[54] ORGANIC VEHICLE FOR ELECTRONIC COMPOSITION

[75] Inventors: Lech Wilczek, Wilmington, Del.; James W. O'Neil, Chadds Ford, Pa.

[73] Assignee: E. I. Du Pont de Nemours and Company, Wilmington, Del.

[21] Appl. No.: 25,635

[22] Filed: Feb. 16, 1993

[51] Int. Cl.⁵ .......................... H01B 1/00; H01B 102; H01B 120

[52] U.S. Cl. .................. 252/512; 252/514; 252/518; 252/521

[58] Field of Search ............... 252/500, 512, 514, 518, 252/521

[56] References Cited

U.S. PATENT DOCUMENTS 4,504,007  3/1985  Anderson, Jr. et al. ............ 228/123

FOREIGN PATENT DOCUMENTS 247346  12/1985  Fed. Rep. of Germany .

Primary Examiner—Paul Lieberman
Assistant Examiner—M. Kopec

[57] ABSTRACT

An electronic paste composition is disclosed which contains inorganic particles and a liquid vehicle.

17 Claims, No Drawings

ORGANIC VEHICLE FOR ELECTRONIC COMPOSITION

BACKGROUND OF THE INVENTION

Field of the Invention

This invention relates to compounds useful as a vehicle for a paste for electronics applications and as a fluxing additive in wire solder fluxes. More particularly, this invention relates to a liquid vehicle for suspending inorganic particles which are used in thick film and solder paste applications.

Description of Related Art

The electronics industry uses particulate-based high-solids pastes in a variety of applications to ultimately provide conductive or dielectric capability in an electronic component. These pastes typically contain inorganic particles and an organic medium or vehicle. The inorganic particles provide the electrical functionality in the ultimate application, i.e., insulative or non-conducting inorganic particles form dielectric parts, and conductive inorganic particles, primarily metals, form conductive parts. The organic medium facilitates application and control of the location of the inorganic particles. After application of the paste, the organic medium is removed by heating and the inorganic particles are fused or sintered to form the electrically functional part. To apply the paste to the desired locations in the desired patterns, it is necessary that the paste flow well with the application method employed, such as stencil or screen printing, pressure dispensing, syringe dispensing, etc.

A rheology modifying agent or agents is typically included in the paste formulation for the paste to have the appropriate flow or rheological characteristics. Particularly desirable rheological characteristics of the paste include high viscosity, which precludes separation or settling of the inorganic particulate in the paste, dripping, stringiness, and slumping or sagging; pseudoplasticity, which provides shear thinning for improved printing characteristic; sufficient tackiness to hold components; good transfer through the printing pattern; good print definition; and clean release from the screen or stencil.

Effective amounts of rheology modifying agents, other organic ingredients, and acidic and/or basic activators, are typically so high that the organic ingredients leave a substantial residue on the solder after reflow. For example, rosin is typically present in a solder paste in the amount of 1 to 6% by weight of the paste. This amount of rheology modifying agent leaves a substantial, readily visible and potentially detrimental solder-coating residue.

It is necessary to wash off residues since the residues contain various ionic contaminants and other chemical agents which can cause shorting and product failures over time. Despite the undesirability of these residues, they have been of little concern until recently because chlorofluorocarbon solvents effectively and easily remove the residues. Today, however, considerable efforts are being made to replace such chlorofluorocarbon solvents due to their environmental impact upon the earth's stratosphere. In addition the failure of cleaning agents to completely remove residues from tight, hard-to-reach spots, and from under components in surface mount or fine pitch assembly operations, makes current methods and proposed alternative cleaners less effective.

As a result, there arises a need for a solder paste composition which does not require cleaning of the residues remaining after reflow. To eliminate the need for cleaning, it is critical to formulate pastes in such a manner that after reflow the amount of residue is minimal and innocuous. Residue should be minimal so as to not interfere with electrical probing of the solder joint, adhesion of conformal coatings, as well as for aesthetic reasons. The residue must be innocuous so it will neither cause corrosion nor provide a conductive path for leakage currents between adjacent conductors.

Similarly, in electronic thick film pastes, the amount of organic ingredients should be minimized. When present in the final product, such ingredients and residues thereof, are undesirable contaminates that deleteriously effect the electrical performance of the part.

SUMMARY OF THE INVENTION

The invention is an electronic paste composition comprising:
a) inorganic particles and
b) a vehicle comprising
a liquid formulation containing at least one compound having an molecular weight of about 200 to about 500 of the structure,

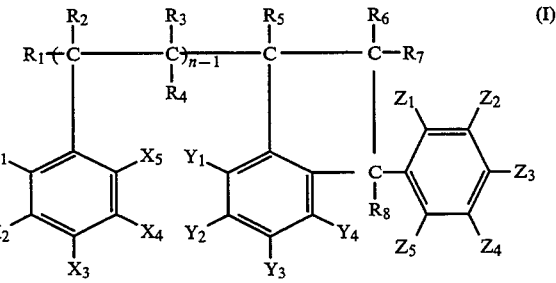

or the structure,

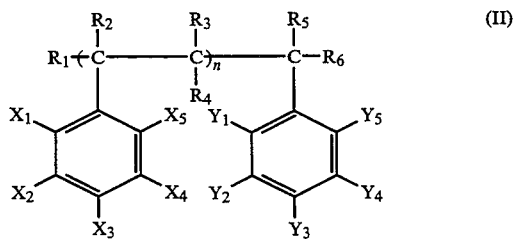

or the structure

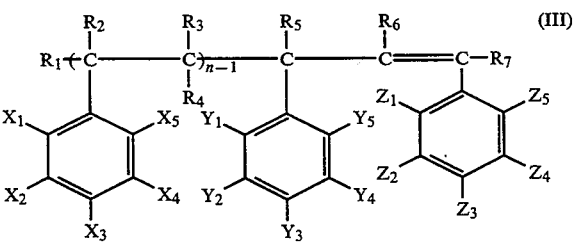

or the structure

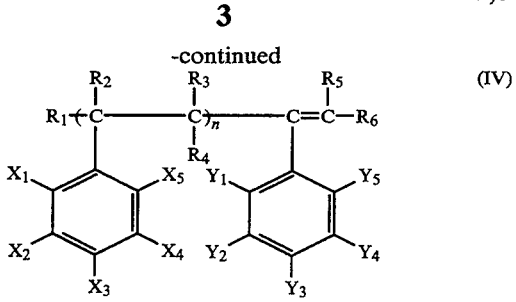

-continued where
R$_1$ through R$_8$, are independently selected from the group consisting of hydrogen, phenyl, alkyl containing 1 to 10 carbon atoms, and cycloalkyl containing 5 to 10 carbon atoms, with the proviso that at least one of R$_1$ and R$_2$ is different than hydrogen and at least one of R$_3$ and R$_4$ is hydrogen;

X$_1$ through X$_5$, Y$_1$ through Y$_5$, and Z$_1$ through X$_5$ are independently selected from the group consisting of hydrogen, phenyl, alkyl, cycloalkyl, acyl, alkoxyl, carboxyl, carboxyl ester, and hydroxyl; and wherein said substituents each contain 10 or fewer carbon atoms; and n is 1 or 2.

In another embodiment, the invention is a composition particularly adapted for attaching a metallic lead of an electronic component to a metallization on a printed wiring board, wherein at least the lead or the printed wiring board metallization is precoated with solder, the composition comprising the electronic paste composition described above but without the inorganic particles and further containing an activator.

DESCRIPTION OF THE PREFERRED EMBODIMENT(S)

The invention is an electronic paste composition. The composition comprises a vehicle and inorganic particles. The vehicle comprises a compound of the structure I, II, III, or IV.

Preferred groups for R$_1$ through R$_8$ are hydrogen and methyl.

Examples of substituents for X$_1$ through X$_5$, Y$_1$ through Y$_5$, and Z$_1$ through Z$_5$ include hydrogen, methyl, ethyl, propyl, n-butyl, t-butyl, sec-butyl, n-decyl, p-tolyl, benzyl, 2-ethylhexyl, 1,1,3,3-tetramethylbutyl, methoxy, 2-ethoxyethoxy, phenoxy, cyclohexyl, acetyl, butyryl, carboxyl, hydroxyl, etc. Hydrogen, acetyl and t-butyl are preferred X$_1$ through X$_5$, Y$_1$ through Y$_5$, and Z$_1$ through Z$_5$ substituents. It is preferred to have monosubstitution on an aromatic ring, i.e., substitions with one substituent other than hydrogen.

Since n is 1 or 2, the compounds are dimer and trimer oligomers. The presence of higher oligomers, such as tetramers, pentamers etc., is acceptable provided it does not adversely affect the properties of the electronic paste needed for the operation of this invention.

Synthesis

The compounds of the structures I, II, III, and IV are prepared from a compound of styrene type by a series of reactions which cause it to undergo oligomerization, and if desired, functionalization by introduction X$_1$ through X$_5$, Y$_1$ through Y$_5$, and Z$_1$ through Z$_5$ substitutents on one or more of the phenyl groups. In the oligomerization reaction, the starting monomer, when reacted in the presence of an initiator or a catalyst, oligomerizes to dimeric and trimeric forms of the monomer. Higher oligomers may be present as a by-product of the synthesis reaction, but are generally in such small amounts as to be insignificant relative to the dimer and trimer compounds. The starting compound may also undergo cyclization during oligomerization to form an indan compound (structure I). The oligomerization reaction is conventional and may be cationic polymerization or anionic polymerization reactions.

Compounds of the styrene type particularly useful as raw materials in the synthesis of compounds of structures I, II, III, and IV include styrene, alpha-methylstyrene, styrene substituted in alpha or beta position with alkyls having 1 to 10 carbon atoms, and styrene derivatives substituted with X$_1$ through X$_5$, Y$_1$ through Y$_5$, and Z$_1$ through Z$_5$ substitutents. A preferred starting compound is alpha-methylstyrene (AMS).

For cationic polymerization, the compounds, particularly compounds of the structures I, III, and IV, are synthesized by reacting the starting monomer in the presence of a catalyst. Conventional cationic polymerization reaction is disclosed in Carbocationic Polymerization, Kennedy et al., 1982, John Wiley & Sons.

Conventional catalysts are suitable for use in the cationic polymerization reaction include Lewis and protonic acids. Exemplary catalysts include aluminum chloride, boron trichloride, titanium tetrachloride, trifluoromethane sulfonic acid, trifluoroacetic acid, chloroacetic acid, dichloroacetic acid, mixtures of trifluoroacetic acid or dichloroacetic acid with boron trichloride, and methane sulfonic acid.

Cationic polymerization may be carried out in the presence or absence of a solvent. Solvents may be polar or non-polar. Examples of solvents include, but are not limited to, carbon dioxide; sulfur dioxide; carbon disulfide; aliphatic and aromatic hydrocarbons, e.g., heptane; and halogeno- and nitro-hydrocarbons; such as, for example, dichloromethane, 1,1,1-trichloroethane, 1,2-dichloroethane, chloroform, and carbon tetrachloride.

It has been found that the composition and the structure of the compounds resulting from the cationic polymerization reaction is determined by the temperature at which the reaction occurs, the rate of addition of the monomer, the solvent media used, and the type and concentration of the catalyst used. The reaction temperature can be −100° C. to 250° C., preferably 20° C. to 140° C., and most preferably 90° C. to 130° C. In general, the higher the reaction temperature, the more likely the dimer structure will be formed. Higher reaction temperatures may be used by refluxing higher boiling solvents, e.g., 1,2-dichloroethane, heptane or monomer, than, for example, methylene chloride. If the monomer is added slowly and in diluted form, a higher concentration of dimer would form, particularly at higher temperatures. However, the temperature appears to have the greatest effect in obtaining dimeric compounds. Lower molecular weight compounds and the compounds of structure I are more likely to be formed when the concentration of the starting monomer is less than or equal to 10 weight percent of the reaction mixture. The choice of catalyst can affect whether the synthesized compound is saturated or unsaturated and the dimer-trimer ratio. For example, some catalysts, e.g., aluminum chloride, and methane sulfonic acid, primarily yield the fully saturated indan form of alpha-methylstyrene (structure I) whereas other catalysts, e.g., chloroacetic acid with boron trichloride, favor yielding the unsaturated forms of the alpha-methylstyrene dimer (structures III and IV).

The compounds, particularly compounds of structure II, can be synthesized by conventional anionic polymerization as disclosed in *Principles of Polymerization*, G. Odian, Chapter 5-3, "Anionic Polymerization of the Carbon-Carbon Double Bond", 1981, John Wiley & Sons, pgs. 372–396. Typically, organometallic compounds, preferably alkyllithiums are used as initiators in hydrocarbon or ether solvents optionally with some co-initiators, preferably amines or ethers, e.g., N,N,N',N'-tetramethylene diamine, glymes, crown ethers as disclosed in *Recent Advances in Anionic Polymerization*, Hogen-Esch et al., Elsevier, 1987, pgs. 147–152. The composition and the structure of the products are controlled by the initiator/monomer ratio, the type and concentration of initiator, solvent, and co-initiators. The reaction temperature can be $-80°$ to $100°$ C.

The reaction mixture may be subjected to a functionalization reaction to introduce $X_1$ through $X_5$, $Y_1$ through $Y_5$, and $Z_1$ through $Z_5$ substituents onto one or more of the phenyl rings of the compounds. The oligomerization reaction mixture can be distilled to separate the individual components. The individual components or preferably the reaction mixture from the oligomerization reaction can be reacted in the functionalization reaction. Alternatively, the oligomerization and functionalization reaction can be carried out sequentially in a 'one pot' reaction. It is preferred that the compounds be synthesized by oligomerization followed by functionalization. Alternatively, the compounds can be synthesized by first functionalization of the phenyl rings on the starting monomer, followed by oligomerization.

The functionalization reaction is conventional and can be done by Friedel-Crafts reaction as disclosed in *Friedel-Crafts Chemistry*, G. O. Olah, 1973, John Wiley & Sons, or by electrophilic substitution or nucleophilic substitution as disclosed in *Advanced Organic Chemistry*, J. March, 1985, John Wiley & Sons. The Friedel-Crafts reaction is preferred since it is simple, effective and controllable.

The catalysts and solvents as described previously in the cationic polymerization reaction are suitable for use in the Friedel-Crafts reaction to functionalize the phenyl rings. Other catalysts which can be used in the Friedel-Crafts reaction include, but are not limited to, ferric chloride, antimony pentachloride, boron trifluoride, zinc chloride, hydrofluoric acid, $H_2SO_4$, $H_3PO_4$, and $P_2O_5$.

Included with the reaction mixture during the functionalization reaction is a compound which will provide the appropriate functionality to the phenyl group, that is the $X_1$ through $X_5$, $Y_1$ through $Y_5$, and $Z_1$ through $Z_5$ substitutents. For example, 2-chloro-2-methylpropane forms a t-butyl substituent; acetyl chloride forms an acetyl substituent. (See Preparations 2 through 4, below.)

In the functionalization reaction, the degree, i.e., the number of phenyl rings which are mono-, di- and tri-substituted, and the amount of substitution, i.e., the number of original molecules which are substituted, are controlled by: concentration ratio of dimer-trimer mixture to precursor of substituent to be substituted; catalyst; solvent; reaction temperature; and reaction time. Particularly after functionalization, one or more isomeric forms of the substituted dimer and the substituted trimer of the compound may be present. It should be understood that the percent substitution on the phenyl rings, e.g., 40% butylation, 25% acetylation etc., represents the portion of the starting compound which upon functionalization, is mono-, di-, and tri- substituted.

Vehicle

One or more of the compounds represented by the structures I through IV may be used in a vehicle for an electronic paste. Preferably, the vehicle contains more than one compound of the structures I, II, III, and IV.

The molecular weight of a compound can range between about 200 and about 500. Compounds of general structure I-IV having higher molecular weights may also be included in the vehicle in small amounts, i.e., typically less than 2 percent, without detrimental effect upon paste performance. However, it is preferred that the average molecular weight of the mixture be between about 200 and about 500. The average molecular weight is estimated based upon the weighted average percent of each of the individual compounds of the mixture. The weighted average percent of each compounds in a mixture can be determined by gas or liquid chromotography or other analytical techniques which are well known in the art.

The compounds having molecular weights in the desired range typically are liquid at room temperature, that is between 20° C. and 25° C. However, compounds that are solids at room temperature may also be included in the vehicle provided the vehicle is a liquid at room temperature.

The compounds provide desirable rheological and flow properties to electronic pastes. Since they function as both solvents and rheological modifiers, the rheology of the paste can be controlled without the need for solvents or high concentrations, that is, greater than about 1% by weight, of other rheological modifiers used in conventional paste compositions.

The rheology of the paste is influenced by the mixture of the compounds, and in particular by distribution of the dimer and trimer in the vehicle. As more trimer is added to dimer, the mixture becomes more viscous and therefore, the need for other rheological modifiers or additives can be minimized. Since the mix of the dimers and trimers can be adjusted synthetically, the viscosity of the mixture can be optimized for consistent rheological performance in a paste.

Viscosity for a compound or mixture of compounds for use in a vehicle ranges between about 30 to about 350,000 cp, preferably between about 75 to about 1000 cp, at room temperature. Viscosity for a paste containing a compound or mixture of compounds ranges between about 300,000 to about 1,500,000 cp, preferably between about 500,000 to about 1,000,000 cp, at room temperature.

Additionally, the compounds have an advantage of high fugitivity, that is easily volatize at elevated temperatures, thus minimizing residues. In particular, the dimeric form of the compound is highly volatile at elevated temperatures. Although, the trimer portion will enhance viscosity, it can leave residues which can ultimately require cleaning of electronic packages. Therefore, it is desirable to maximize the amount of the dimer in the vehicle in order to minimize the residues after reflow. Additionally, the presence of a functional group on one or more of the phenyl rings may maintain or improve volatility of the compound. For example, a mono- or di- substituted dimer may be more volatile than an unsubstituted trimer.

The absence of polar groups on the compounds provides them with hydrophobicity. This is an advantage since a paste formulated with one or more of the compounds is less likely to change consistency due to environmental conditions, and the printability of the paste can be uniform over time. While hydrophobicity of one or more compounds as the primary component in the vehicle is desirable, the primary component may be incompatible with other components in the vehicle which are hydrophilic, such as activators, and other polar components in the vehicle that have some hydrophilicity. Functionality on the phenyl groups of the compound can influence its ability to incorporate into other components of the vehicle and can enhance paste stability. Crystallization of a compound is undesirable since it deters from paste stability and can result in residues after heating. Crystallization of the compound or mixture of compounds after incorporation into the vehicle or paste composition can be mitigated by the presence of a functional group on the phenyl ring.

It is preferred to minimize the degree of olefinic unsaturation in the compound or mixture of compounds used in the vehicle. Polymerization of unsaturated compounds during reflow can cause undesirable residues. Although unsaturated compounds can be used to control rheology and pseudoplasticity when using conventional paste additives, compounds based upon the indan structure (I) are preferred since these compounds volatize more easily and generally are stable upon paste aging.

The preferred compounds are those derived from alpha-methylstyrene. Particularly preferred are,

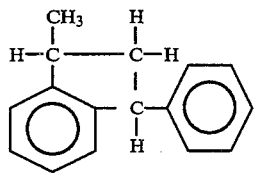

(1) 1-methyl-3-phenylindan

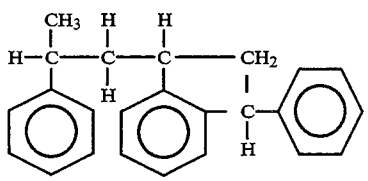

(2) 2-phenylpropyl-3-phenylindan

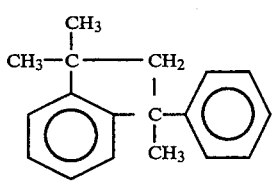

(3) 1,1,3,trimethyl-3-phenylindan

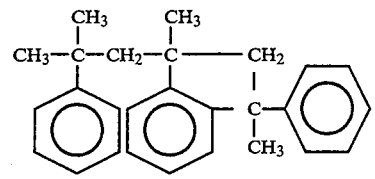

(4) 1,3 dimethyl-1-(2-methyl-2-phenylpropyl)-3 phenylindan

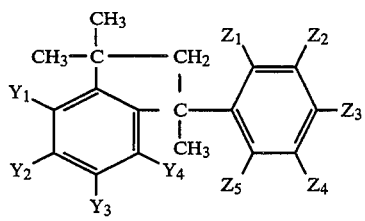

(5) 1,1,3-trimethyl-3-(t-butylphenyl) indan
($Y_1$ through $Y_4$ = H; one of $Z_1$ through $Z_5$ = t-butyl)

(6) 1,1,3-trimethyl-3-(acetylphenyl)indan ($Y_1$ through $Y_4$=H; one of $Z_1$ through $Z_2$=—COCH$_3$)

(7) 1,1,3-trimethyl-3-phenyl-t-butylindan one of $Y_1$ through $Y_4$=t-butyl; $Z_1$ through $Z_5$=H)

(8) 1,1,3-trimethyl-3-phenyl-acetylindan (one of $Y_1$ through $Y_4$=—COCH$_3$; $Z_1$ through $Z_5$=H)

(9) 1,1,3-trimethyl-3-(t-butylphenyl)-t-butylindan (one of $Y_1$ through $Y_4$=t-butyl; one of $Z_1$ through $Z_5$=t-butyl)

(10) 1,1,3-trimethyl-3-(acetylphenyl)-acetylindan (one of $Y_1$ through $Y_4$=—COCH$_3$; one of $Z_1$ through $Z_5$=—COCH$_3$)

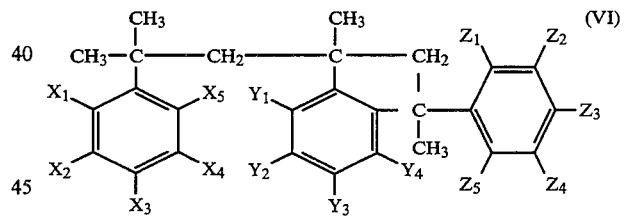

(12) 1,3-dimethyl-1-(2-methyl-2-phenylpropyl)-3-(acetylphenyl)indan ($X_1$ through $X_5$=H; $Y_1$ through $Y_4$=H; one of $Z_1$ through $Z_5$=—COCH$_3$ )

(13) 1,3-dimethyl-1-(2-methyl-2-phenylpropyl)-3-phenyl-t-butylindan ($X_1$ through $X_5$=H; one of $Y_1$ through $Y_4$=t-butyl; $Z_1$ through $Z_5$=H)

(14) 1,3-dimethyl-1-(2-methyl-2-phenylpropyl)-3-phenylacetylindan ($X_1$ through $X_5$=H; one of $Y_1$ through $Y_4$=—COCH$_3$; $Z_1$ through $Z_5$=H)

(15) 1,3-dimethyl-1-[2-methyl-2-(t-butylphenyl)propyl]-3-phenylindan ($X_1$ through $X_5$=t-butyl; $Y_1$ through $Y_4$=H; $Z_1$ through $Z_5$=H)

(16) 1,3-dimethyl-1-[2-methyl-2-(acetylphenyl)propyl]-3-phenylindan (one of $X_1$ through $X_5$=—COCH$_3$; $Y_1$ through $Y_4$=H; $Z_1$ through $Z_5$=H)

(17) 1,3-dimethyl-1-[2-methyl-2-(t-butylphenyl)propyl]-3-(t-butylphenyl)indan (one of $X_1$ through $X_5$=t-butyl; $Y_1$ through $Y_4$=H; one of $Z_1$ through $Z_5$=t-butyl)

(18) 1,3-dimethyl-1-[2-methyl-2-(acetylphenyl)propyl]-3-(acetylphenyl)indan (one of $X_1$ through $X_5$=—

COCH₃; Y₁ through Y₄=H; one of Z₁ through Z₅=—COCH₃)

(19) 1,3-dimethyl-1-[2-methyl-2-(t-butylphenyl)propyl]-3-phenyl-t-butylindan (one of X₁ through X₅=t-butyl; one of Y₁ through Y₄=t-butyl; Z₁ through Z₅=H)

(20) 1,3-dimethyl-1-[2-methyl-2-(acetylphenyl)propyl]-3-phenyl-acetylindan (one of X₁ through X₅=—COCH₃; one of Y₁ through Y₄=—COCH₃; Z₁ through Z₅=H)

(21) 1,3-dimethyl-1-(2-methyl-2-phenylpropyl)-3-(t-butylphenyl)-t-butylindan (X₁ through X₅=H; one of Y₁ through Y₄=t-butyl; one of Z₁ through Z₅=t-butyl)

(22) 1,3-dimethyl-1-(2-methyl-2-phenylpropyl)-3-(acetylphenyl)-acetylindan (X₁ through X₅=H; one of Y₁ through Y₄=—COCH₃; one of Z₁ through Z₅=—COCH₃)

(23) 1,3-dimethyl-1-(2-methyl-2-(t-butylphenyl)propyl)-3-(t-butylphenyl)-t-butylindan (one of X₁ through X₅=t-butyl; one of Y₁ through Y₄=t-butyl; one of Z₁ through Z₅=t-butyl)

(24) 1,3-dimethyl-1-(2-methyl-2-(acetylphenyl)propyl)-3(acetylphenyl)-acetylindan (one of X₁ through X₅=—COCH₃; one of Y₁ through Y₄=—COCH₃; Z₁ through Z₅=—COCH₃)

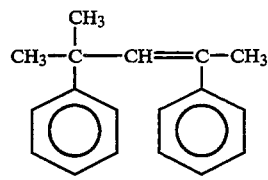

(25) 4-methyl-4-phenyl-2-phenyl-2-pentene

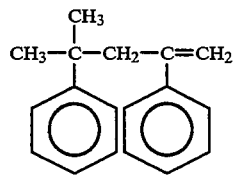

(26) 4-methyl-4-phenyl-2-phenyl-1-pentene

It is preferred for the unsubstituted indan oligomers of alpha-methylstyrene to have about 55 to 65% dimer and about 35 to 45% trimer, and most preferred to have 60% dimer and 40% trimer. For dimeric and trimeric compounds of alpha-methylstyrene t-butyl substituted, it is preferred to have about 75 to 100% dimer and about 0 to 25% trimer with 10 to 100% t-butyl substitution, and most preferred to have 95 to 98% dimer and 2 to 5% trimer which is substituted about 25% with t-butyl groups. For other functionalizations as well as other compounds of structures I through IV, the ratio of dimer to trimer compounds suitable for use may be different.

Other Components in the Vehicle

The paste vehicle optionally may contain one or more rheology modifying agents to enhance the rheological performance of the paste while not detrimentally affecting the residue after reflow. Conventional rheology modifying agents include, for example: castor oil; hydrogenated castor oil; rosins and derivatives thereof, such as hydrogenated rosin, polymerized rosin, synthetic and natural rosins, etc. Preferred rheology modifying agents are hydrogenated rosins, hydrogenated castor oil, and mixtures thereof. The rheological modifying agent may be present up to about 1% of the paste composition by weight, preferred is less than about 0.5%.

Optionally, the vehicle may also contain one or more solvents and/or diluents without adverse affect on the paste performance. Solvents and/or diluents may be incorporated into the paste composition to make the components more compatible. Any solvent compatible with the other compounds in the paste, or which enhances the compatibility of various components in the paste, is suitable. Suitable solvents include, but are not limited to: alcohols, such as, propyl and stearyl alcohols; ketones, such as methyl ethyl ketone and methyl isobutyl ketone; hydrocarbons, such as heptane and toluene; and esters, such as ethyl acetate, and amyl acetate.

The paste vehicle can also contain an active hydrogen-containing compound typically referred to as an activator. The activator preferably becomes active at an elevated temperature to assist in the removal of surface oxides which may form on the surface of metals. The activator can also enhance solder flow, solder wetting, and should leave a non-corrosive residue after reflow. It is preferred that the activator leave no or minimal residue after reflow. Typical activators are active hydrogen-containing compounds, such as: hydroxyl substituted amines, such as diethanolamine, triethanolamine, 2-hydroxyquinoline, 8-hydroxyquinoline, alpha-hydroxymethylpyridine, 2-(2-aminoethylamino) ethanol, diglycolamine, and N-hydroxyethyl ethylenediamine, etc.; mono- and multi- basic acids, such as, acetic acid, formic acid, adipic acid, malonic acid, succinic acid, glutaric acid, etc.; phenols and derivatives thereof; hydroxy acids and salts and derivatives thereof, such as, hydroxyacetic acid and citric acid, etc. Particularly preferred activators are substituted malonic acids, unsubstituted malonic acids and alkanolamines or mixtures thereof. The activator may be present in the amount of 0.5 to 5 weight % of the paste composition, preferably 1.5 to 2.5% of the paste composition.

The present vehicle can also contain minor amounts of other materials used in conventional fashion without departing from the concept of this invention. Such other materials include preservatives, modifiers, sequestrants, dispersion agents, antibacterial agents, and the like.

Electronic Paste

The paste compositions of the invention also contain finely divided inorganic particles suspended in a vehicle. The inorganic particles may be any which are conventionally included in electronic paste compositions. For example, metals, such as, tin, lead, silver, bismuth, indium, gold, copper, zinc, germanium, antimony, gallium, tungsten, and molybdenum; and metalloids, such as, silicon, and phosphorous; and alloys or mixtures of the metals and metalloids, are suitable. Other inorganic particles that are conductive phases include, but are not limited to, oxides of indium, thallium, palladium, tungsten, osmium, iridium, ruthenium, and rhodium; perovskite ruthenates; and pyrochlore ruthenates.

Also suitable are non-metallic inorganic particles which include ceramics, glasses, oxides, sulfides, borides and carbides. Ceramics include, but are not limited to, alumina, titanares, zirconates, stannates, manganates, zirconium silicates, aluminum silicates, aluminum nitride, magnesium silicates, magnesium aluminosilicates, and quartz. Glasses can be either crystallizable or non-crystallizable and can include glass formers and/or modifiers such as, for example, borates, silicates, borosilicate glasses, oxide glasses, lead oxides, cobalt oxides, bismuth oxides, zinc oxides, boronoxides, silica oxides, antimony oxides, magnesium oxides and mixtures thereof. Borosilicates can include, but are not limited to, lead borosilicate frits, and bismuth, calcium, barium, calcium and other alkaline earth borosilicate frits. Oxide glasses can include, but are not limited to, aluminophosphates, aluminophosphosilicates, aluminoborophosphosilicates, phosphoborosilicates and mixtures thereof which can optionally contain alkali or alkaline earth cations to control properties of the glass such as moisture resistance, acid/base resistance and thermal expansion characteristics.

Conventional metal or metal alloy inorganic particles particularly useful for assembly soldering of electronic components include a 63% tin-37% lead solder, or a 62% tin-36% lead-2% silver solder. Other metal or metal alloy solders may also be used, such as alloys of tin-indium, tin-bismuth, or tin-lead-bismuth. Preferred thick film metallic inorganic particles are copper, silver, gold, platinum, palladium and other precious metals. Preferred thick film non-metallic inorganic particles are alumina; titanates, including barium, calcium, strontium, bismuth, and lead titanates; zirconates, including calcium, and barium zirconates; stannates including magnanite calcium, barium, and bismuth stannates; oxides including bismuth trioxides, and copper, iron, lead, zinc, titanium and silica oxides; zirconium orthosilicate (zircon); aluminum silicates (kyanite and mullite); magnesium orthosilicate (fosterite); lead borosilicates; calcium zinc borosilicates; and magnesium aluminosilicates (corderite). As is well known in the art, thick film compositions are formulated with combinations of the above materials to provide specific electrical and functional properties.

The inorganic particles are normally smaller than 100 mesh (149 micron), and preferably smaller than 200 mesh (74 micron), particularly for solder paste applications. Powder particles smaller than 325 mesh (44 micron) are also suitable for use. Particles less than 10 microns are preferred in thick film pastes.

The amount of inorganic particles in the electronic paste may range from about 65 to about 95 weight percent of the paste composition. The amount of metallic inorganic particles in a solder paste may range from about 75 to about 95 weight percent, preferably from 89 to 92 weight percent. The amount of metallic inorganic particles in a thick film conductor paste may range from about 75 to about 91 weight percent of the paste composition. The amount of non-metallic inorganic particles in a thick film dielectric paste may range from about 65 to about 80 weight percent of the paste composition.

Any well known techniques for preparing the paste may be utilized. Printing of the solder paste is by conventional techniques, typically using stencils and screens. The stencil or screen printable paste composition may be applied to any suitable substrate, particularly metal features on printed wiring boards or ceramic substrates, to form the desired pattern. Another advantage to using the compounds is that the compounds impart tackiness to the vehicle so that components which are mounted on boards can remain in place prior to and during reflow.

Alternatively, the vehicle and the inorganic component may be applied separately, e.g., wave soldering. This method is particularly useful for the attachment of electronic components to a printed wiring board wherein either the component or board is precoated with solder. The vehicle comprises one or more of the compounds of structures I–IV and an activator, and optionally a solvent carrier. Conventional activators and solvents as described for paste applications are also suitable in wave soldering applications.

EXAMPLES

The following preparations and examples are used to illustrate this invention without limitation. All percentages are by weight unless otherwise specified.

PREPARATIONS

Unless otherwise noted, the composition of the compounds of this invention (% dimer and % trimer as well as % substituted dimer and trimer) resulting from the following preparations was determined by gas chromotography (GC) based on the area peak ratio neglecting differences in the response factors for individual compounds.

PREPARATION 1

Preparation of Alpha-Methylstyrene Indan (IAMS) Compounds

Alpha-methylstyrene (AMS) (2.0 L, 15.4 mole) was added slowly with stirring over 2 to 3 hrs to a mixture of $AlCl_3$ (0.7 g, 5.2 mole) and dichloromethane (1.0L, dried over 3Å molecular sieves) in 4L beaker, in a drybox at room temperature. After the addition of 1L AMS, about 0.2L dichloromethane was added to make up for the solvent evaporated due to the reaction exotherm. After the addition of all AMS, the reaction mixture was deactivated with 0.3L methanol, washed three times with water, dried over calcium chloride, filtered and volatiles stripped first using a rotary evaporator and then high vacuum. Yield was 1,685 g (93%) of colorless, transparent oil. The material was analyzed to contain 60.5% dimer; 1,1,3-trimethyl-3-phenylindan (Registry No. 3910-35-8; GC/MS: Calc. 236.726, Found 236,157); and 39.5% trimer isomers; 1,3-dimethyl-1-(2-methyl-2-phenylpropyl)-3-phenylindan (Registry No. 41906-7-2; GC/MS: Calc. 354.905, Found 354.234). 1H NMR ($CDCl_3$): ppm 0.8–2.7 (m, br, aliph.13H), 7.0–7.3 (m, br, arom.11 H) The viscosity of the mixture of compounds at 26° C. was 782 cp and was adjusted to 880 cp by distilling off 57 g dimer on a Kugelrohr. When the mixture was distilled, the composition of the distillate was 56.4% dimer and 41.8% trimer.

PREPARATION 2

Preparation of t-Butyl- and di-t-Butyl-1,1,3-trimethyl-3-phenylindan

The reaction product from Preparation 1 was fractionally distilled to yield the dimeric form of IAMS, and was collected for use as a starting material for Preparation 2. A mixture of 1, 1,3-trimethyl-3-phenylindan (53 g, 0.225 mole), 2-chloro-2-methylpropane (41.6 g, 0,449 mole), $AlCl_3$ (0.5 g,3.76 mmole) and dichloromethane (60 mL, dried over 3Å molecular sieves) was stirred for three days at room temperature in a drybox. The reaction mixture was deactivated with 10 mL methanol, diluted with 100 mL dichloromethane, washed four times with water, dried over calcium chloride, filtered and volatiles stripped first using a rotary evaporator and then high vacuum. Yield was 53.5 g (68%) of yellow, transparent, viscous oil. The material was analyzed as containing 14% unreacted dimer; 43% t-butyl-1,1,3-trimethyl-3-phenylindan isomers (Registry No. 100404-45-3; GC/MS: Calc. 292.466, Found 292,200); and 33% di-t-butyl-1,1,3-trimethyl-3-phenylindan isomers (Registry No. 110528-60-4; GC/MS: Calc.348,574, Found 348.279). With this preparation, up to about 10% impurities were formed as by-products of the reaction. Of the 10% impurities, none of the by-product compounds were more than about 1-2% 1H NMR (CDCl$_3$): ppm 1.0– 2.7 (m, br, aliph. 19.7H) , 7.1–7.5 (m, br, atom. 7.0 H).

PREPARATION 3

Preparation of t-Butyl-1,1,3-trimethyl-3-phenylindan using a one pot/two step process.

AMS (100 mL, 0.77 mole) was added slowly with stirring over 45 min. to a mixture of AlCl$_3$ (0.2 g, 1.50 mmole) and 1,2-dichloroethane (100 mL) at 60°–90 ° C. under nitrogen. After 1 h GC showed no unreacted AMS, 79% indan dimer and 15% indan trimer isomers in the reaction system. The mixture was cooled down to room temperature. AlCl$_3$ (0.5 g, 3.75 mmole) and 2-chloro-2-methylpropane (10 mL, 0.119 mole) were added with stirring. After 3 hrs the reaction mixture was deactivated with 40 mL methanol, washed three times with water, dried over calcium chloride, filtered and volatiles stripped first using a rotary evaporator and then high vacuum. Yield was 82 g (84%) of colorless, transparent oil. The material was analyzed to contain 60% indan dimer (unsubstituted); 19% t-butyl-1,1,3-trimethyl-3-phenylindan isomers (monosubstituted); and 11% indan AMS trimer isomers. The viscosity was 304 cp at 23° C. 1H NMR (CDCl$_3$): ppm 0.8–2.5 (m, br, aliph.12.8H) , 6.9–7.3 (m, br, arom. 8.6H) .

PREPARATION 4

Preparation of Acetylated 1,1,3-trimethyl-3-phenylindan compounds

AMS (100 mL, 0.77 mole) was added with stirring over 35 minutes to a mixture of AlCl$_3$ (0.1g, 0.75 mmole) and 1,2-dichloroethane (50 mL) at 76°–102 ° C. under nitrogen, producing a brown mixture. After cooling to room temperature, a mixture of AlCl$_3$ (17g, 0.13 mole), and acetyl chloride (10g, 0.13 mole) in dichloromethane (40 mL), previously prepared in the drybox, was added over several minutes, causing an exotherm to 40 ° C. The resulting dark orange-brown mixture was left to stir overnight, causing the color to darken even more. The reaction was quenched with methanol (75 mL), washed three times with water, and the organic layer was dried for 3h over CaCl$_2$, filtered and volatiles removed, first on a rotary evaporator, then under high vacuum. Yield: 81.0 g dark brown oil with viscosity of 488 cp (23° C.), analyzed to contain 57% unreacted indan dimer, 29% acetyl-1,1,3-trimethyl-3-phenylindan (Registry No. 74722-60-4 identified by GC/MS in a separate experiment) , 2% diacetyl-1,1,3-trimethyl-3-phenylindan (Registry No. 74722-66-0, identified by GC/MS in a separate experiment), and 5% unsubstituted trimer isomers. 1H-NMR (CDCl$_3$): ppm 0.9–2.7 (m,br,11.6H) , 6.9–8.0 (m, br, 8.5H)

PREPARATION 5

Preparation of mixed indan alpha-methylstyrene (IAMS) and linear ethylenic alpha-methylstyrene (AMS) compounds A solution of AMS (250 mL, 1.93 mole) in dichloromethane (375 mL) was added over 3 hours with stirring to a mixture of chloroacetic acid (18.2 g, 0.193 mole), boron trichloride (1M in dichloromethane, 38.5 mL, 0.0385 mole), and dichloromethane (250 mL) at reflux. The colorless cloudy mixture was then stirred at room temperature for 72 hours. After deactivating with methanol, water was added, the product layer was separated, the solvent was stripped off on a rotary evaporator, and the product was pumped on under high vacuum. Yield was 212 g (93%) of a colorless, slightly cloudy liquid. The material was analyzed to contain 5% indan dimer, 1,1,3-trimethyl-3-phenylindan; 39% exo and 32% endo linear ethylenic dimers (GC/MS: Calc. 236.726, Found 236,157); and 21% indan and linear unsaturated trimers (GC/MS: Calc. 354.905, Found: 354.234).1H NMR (CDCl$_3$): ppm 0.8–2.9 (m, br, aliph.with 9.8H), 4.7–5.3 (m, ethylenic 1.2H) , 7.0–7.5 (m, br, arom. 10.7H).

Unless otherwise noted, the pastes of the examples were made by hand mixing a metal powder of 63% tin/37% lead (Sn/Pb) into the liquid organic medium. The particle size of the metal powder was −325 mesh (44 microns) to +500 mesh (approx. 25 microns), which is known as Type 3 in the industry. Nine grams of the metal powder were mixed with the vehicle compound of this invention, then the activator was added and mixed to the metal-vehicle mixture. All organic solids are pre-dissolved in a compatible liquid before they are mixed into paste form. Unless otherwise noted, the activator was triethanolamine (TEA).

It should be noted that the molecular weight provided for the compounds in the examples, particularly those compounds which have portions of dimer and trimer as well as degrees of saturation and unsaturation, are weighted average molecular weights.

Viscosities of pastes were measured at 25° C. using a Brookfield Digital Viscometer, Model DV-II, spindle F. Liquid viscosities are reported for a compound or mixture of compounds and were measured on a Brookfield Digital Viscometer, Model HBTDCP, at ~25° C.

Print patterns were demonstrated by hand printing about a 5–7 g sample of the paste through a 10 mil thick (approx. 254 microns) stainless steel stencil onto one side of a double-sided copper clad substrate (FR4 board). The print pattern varied in aperature opening width as well as width separation between openings. The smallest features that were printed could typically be found on 20 or 25 mil pitch patterns. The paste appearance on the board was examined for print definition/sharpness, print fullness, slump, bridging and print-to-print consistency.

After printing, the samples were placed into a Vitronics Corp. Infrared reflow furnace, Model 306-benchtop, using a recommended infrared solder reflow profile, which is heated to a peak temperature of about 225° C. in about 3.5 minutes, held at 225° C. for about 15 sec., and then cooled for the remainder of the 10 minute cycle. After IR reflow, the reflowed prints were inspected for appearance, shape and completeness of reflow, e.g. solder coalescence. Also, the residue, that is the organic material which remains after reflow, was examined as to the location, nature, and relative amount.

To obtain a quantitative correlation of a pastes propensity to lose weight upon reflow, due to the volatilization of organics for example, thermogravimetric analysis (TGA) of the pastes were conducted. Thermogravimetric test provides data on material loss, e.g., volatility, degradation and decomposition, by monitoring weight change as a function of temperature and/or time. TGAs were done on a Du Pont Instrument Thermogravimetric Analyzer, Model 951, using a temperature profile which simulated the solder reflow profile described for the Vitronics IR unit, that is about 50° C. to 75° C. per minute heating rate. Samples weighed about 5 milligrams. Data from the TGA which included weight loss of the sample relative to temperature and time, were recorded. Typically, in the TGA the most significant rate of weight loss occurred approaching the peak temperature of about 225° C. This method of analysis gave a general estimate of the performance of the paste in its intended end use.

EXAMPLES 1–3 AND COMPARATIVE EXAMPLE 1

Examples 1 through 3 demonstrate pastes of this invention made with different proportions of the dimer and trimer of alpha-methylstyrene indan (IAMS). The compounds or mixture of compounds in the pastes of Examples 1–3 were liquid and are compared to a paste in which the compound was a solid. The IAMS used in Example 2 was synthesized according to Preparation 1. The compounds for Comparative Example 1 and Example 1 were made by distilling the IAMS formed by Preparation 1 and collecting the distillate, for about 100% dimer (with purity of 99+%), and the remaining compound was essentially 100% trimer. The compound of Example 3 was prepared by adding 100% dimer to a 60% dimer–40% trimer mixture formed by Preparation 1. The paste composition was prepared as described above according to the following:

|  | Comparative Example 1 | Example 1 | Example 2 | Example 3 |
|---|---|---|---|---|
| Compound | IAMS | IAMS | IAMS | IAMS |
| % dimer | ~100 | — | 60 | 80 |
| % trimer | — | ~100 | 40 | 20 |
| % other | — | — | — | — |
| Phase | solid at ambient | liquid | liquid | liquid |
| Molecular Weight | 236 | 354 | ~283 | ~260 |
| Viscosity cp | — | 360,000 | 780 | 140 |
| % Compound | 7 | 5 | 7 | 7 |
| % Activator | 3 | 5 | 3 | 3 |
| % Metal | 90 | 90 | 90 | 90 |

COMPARATIVE EXAMPLE 1

The pure dimer was solid at 20° C. to 25° C. The dimer was melted at 55° to 60° C. and incorporated with the activator and metal on a glass mixing plate. The paste was cooled to room temperature. The paste was very dry and stiff. The paste would not print.

The paste was stored for one day at room temperature. The paste was very dry with a crusty-like consistency and was unprintable.

EXAMPLE 1

The paste was stiff and putty-like when mixed. The paste was printed but printing was difficult. Features which printed had good definition and fullness, but finer features only partially printed. The paste was reflowed as described above and residues were clear, thick, with a gum like nature.

The paste was stored for one day at room temperature, and the paste was very stiff, puttylike with some exudation. The paste was workable and all but the finer features printed completely. The paste was reflowed as described above and the residues were similar in appearance and consistency as the day before.

EXAMPLE 2

The paste was creamy, putty-like with tack when made. The paste was stringy but workable when printed on the substrate. All but the finer features printed completely. The paste was reflowed as described above and the residues were clear, tacky and gum-like.

The paste was stored for one day at room temperature and was putty-like with little exudation. The paste was printed and all but the finer features printed completely. The paste was reflowed as described above and the residues were similar in appearance and consistency as the day before.

EXAMPLE 3

The paste was prepared and was creamy, putty-like with tack. Paste was printed and reflowed as described above. The residues after reflow were hard, gummy-like and less tacky than the residues from Examples 1 and 2.

The paste was stored for one day at room temperature The paste was printed and reflowed as described above and the residues were similar in appearance and consistency as the day before. It should be noted that although the paste performance after 24 hours was satisfactory, the paste and its performance may deteriorate the longer the time between preparation and use, e.g., the paste may become dry and unprintable due to cuptallization of the diemer.

EXAMPLES 4 AND 5

Examples 4 and 5 demonstrate pastes made with a mixture of saturated and unsaturated dimer and trimer of compounds of the invention. The compounds used in Examples 4 and 5 were synthesized similar to Preparation 5, wherein the particular distribution of the compound in the Examples was accomplished by varying the temperature, catalyst, and solvent media according to the teachings of this invention. The paste compositions were prepared as described above according to the following:

|  | Example 4 | Example 5 |
|---|---|---|
| Compound | IAMS | IAMS |
| % dimer | 79 | 72 |
| % sat. dimer | 6.6 | 64 |
| % unsat. dimer | 93.4 | 36 |
| % trimer | 21 | 28 |
| % sat. trimer | 7.0 | 64 |
| % unsat. trimer | 93.0 | 36 |
| % other | ~0.1 | — |
| Phase | liquid | liquid |
| Molecular Weight | ~261 | ~269 |
| Viscosity (cp) | 170 | 168 |
| % Compound | 7 | 7 |

|  | Example 4 | Example 5 |
|---|---|---|
| -continued | | |
| % Activator | 3 | 3 |
| % Metal | 90 | 90 |

EXAMPLE 4

The paste was prepared and was grainy and loose with some exudation. The paste was printed, and all features printed with exudation, and then was reflowed as described above. The paste reflowed with a solid residue between the features and a gummy residue next to the reflowed solder ball.

EXAMPLE 5

The prepared paste was grainy within 2.5 hours after mixing but was puttylike after 24 hours. The paste was workable and the larger features of the pattern were completely printed while the finer features were partially printed The paste was reflowed as described above. All features reflowed and after reflow, the residues were located around the reflowed solder and were gummy in nature, yet clear and transparent.

EXAMPLES 6 AND 7

Examples 6 and 7 demonstrate pastes made with compounds of this invention each having different substituents on the phenyl ring. The compound of Example 6 was prepared according to Preparation 3. The compound of Example 7 was made according to Preparation 4. The paste compositions were prepared as described above according to the following:

|  | Example 6 | Example 7 |
|---|---|---|
| Compound | IAMS with t-butyl subst. | IAMS with acetyl subst. |
| % dimer | 84 | 90 |
| % trimer | 16 | 10 |
| Phase | liquid | liquid |
| Percent Substitution | 25% | 40% |
| Viscosity (cp) | 300 | 1120 |
| % Compound | 7 | 7 |
| % Activator | 3 | 3 |
| % metal | 90 | 90 |

EXAMPLE 6

The paste was puttylike with little exudation. The paste was workable when printed on the substrate. The larger features of the pattern printed completely and the finer features were partially printed. The paste was reflowed as described above and was evaluated for residue. Residue was clear, transparent, hard with mild tack and located primarily next to solder features.

EXAMPLE 7

The paste was creamy, puttylike with tack and little exudation and was workable when printed on the substrate. The larger features of the pattern printed completely and the finer features were partially printed. The paste was reflowed as described above and was evaluated for residue. The residue was clear, gum-like, and located primarily next to solder features.

EXAMPLES 8-25

Examples 8 through 25 demonstrate pastes made with compounds of the present invention incorporating various solder metal compositions and particle sizes as well as various rheology modifiers, viscosity modifiers, diluents, solvents, and activators to demonstrate the versatility of the use of the compounds of the present invention as electronic pastes. The paste compositions were prepared in a Ross mixer, Model LDM ( 1 liter volume); by Charles Ross & Co., in a typical batch size of about 0.5 to 1 lb. of paste [227 to 454 gm] according to the following:

TABLE

| COMPOUND | DESCRIPTION |
|---|---|
| A | Poly(alpha-methylstyrene) indan; (60% dimer/40% trimer; primarily indan saturated structure) |
| B | Poly(alpha-methylstyrene) indan with t-butyl substitution on phenyl group; (primarily dimer indan structure substituted with t-butyl groups; resulting in 32.5% free dimer/38% mono-substituted dimer/12% di-sibstituted dimer/trimer derivatives; with the remaining about 20% being a variety of impurities of no more than 1% individually) |
| C | Poly(alpha-methylstyrene) indan with acetyl substitution on phenyl groups; (99% dimer/1% trimer, primarily indan structure that is substituted approximately 70% with acetyl groups) |
| D | Poly(alpha-methylstyrene) indan with t-butyl substitution on phenyl groups; (primarily 96% dimer/4% trimer combination that is t-butylated, which upon distillation, resulted in 58% dimer/36.4% monosubstituted dimer/4.5% d-substituted dimer.) |
| E | Poly(alpha-methylstyrene) indan with t-butyl substitution on phenyl groups; (primarily 97% dimer/3% trimer combination that was t-butylated, which yielded approximately 57% free dimer/32+% mono-substituted dimer/6.3% di-substituted trimer. No distillation of the mixture.) |
| P-1 | Solder Powder (63% Sn/37% Pb; Type IV; spherical shape) |
| P-2 | Solder Powder (63% Sn/37% Pb; Type III; spherical shape) |
| P-3 | Solder Powder (62% Sn/36% Pb/2% Ag Type III; spherical shape) |

All solder powders, P-1, P-2, P-3, are sold by Advanced Metal Technology. The following compounds are sold by Hercules, Inc,; Foral AX ® modified rosin derivative, Stabelite ® modified rosin, Dymerex ® modified rosin, and Poly-pale ® modified rosin. Thixatrol ST ® in powder form is an organic rheological additive and viscosity modifier, sold by Rheox Corp. Soyalechtin is a viscosity and rheological modifier sold by Soya Co.

|  | Example | | | | | | | | |
|---|---|---|---|---|---|---|---|---|---|
| Compound | 8 | 9 | 10 | 11 | 12 | 13 | 14 | 15 | 16 |
| A | 7.54 | 7.38 | 7.16 | 7.54 | 7.24 | 7.38 | 7.16 | 7.54 | 7.43 |
| Foral AX ® |  | 0.50 | 0.5 |  | 0.47 | 0.5 | 0.5 |  | 0.50 |
| Stabelite ® | 0.50 |  |  |  |  |  |  |  |  |
| Castor Oil (Hydrogenated) |  | 0.27 | 0.27 |  | 0.80 |  | 0.27 |  |  |

-continued

| | | | | | | | | | |
|---|---|---|---|---|---|---|---|---|---|
| Thixatrol ST | 0.16 | | | 0.16 | | | | 0.16 | 0.27 |
| Poly-pale ® | | | | | | | | 0.50 | |
| Stearyl alcohol | | | | | | 0.32 | | | |
| Polymerized Rosin | | | | 0.5 | | | | | |
| TEA | 1.29 | 1.71 | 1.55 | 1.29 | 1.22 | 1.29 | 1.66 | 1.29 | 1.29 |
| Diethylmalonic Acid | | | | | | | 0.41 | | |
| Butylmalonic Acid | | | 0.52 | | | | | | |
| Malonic Acid | 0.51 | 0.34 | | 0.51 | 0.49 | 0.51 | | 0.51 | 0.51 |
| Butyl Carbitol | | 0.4 | | | | | | | |
| P-2 | 90.0 | 89.4 | 90.0 | 90.0 | 90.5 | 90.0 | 90.0 | 90.0 | 90.0 |
| Viscosity (cp) | 716 | 616 | 908 | 736 | 626 | 230 | 860 | 840 | 630 |

| | Example | | | | | | | |
|---|---|---|---|---|---|---|---|---|
| Compound | 17 | 18 | 19 | 20 | 21 | 22 | 23 | 24 | 25 |
| A | 7.54 | 7.54 | 7.54 | 7.54 | 6.41 | 7.54 | | | |
| B | | | | | | | 7.10 | | |
| C | | | | | | 0.04 | | | |
| D | | | | | | | | 7.16 | |
| E | | | | | | | | 7.12 | |
| Foral AX ® | 0.50 | 0.50 | | 0.50 | 0.53 | 0.5 | 0.5 | 0.5 | 0.50 |
| Dymerex ® | | | 0.5 | | | | | | |
| Castor Oil (Hydrogenated) | 0.08 | 0.16 | | 0.16 | 0.18 | 0.12 | 0.38 | 0.300 | 0.34 |
| Thixatrol ST | | | 0.16 | | | | | | |
| Soyalechtin | 0.08 | | | | | | | | |
| Glycerol | | | | | 1.94 | | | | |
| TEA | 1.29 | 1.35 | 1.29 | 1.35 | | 1.40 | 1.32 | 1.53 | 1.53 |
| Malonic Acid | 0.51 | 0.45 | 0.51 | 0.45 | 1.94 | 0.40 | 0.48 | 0.51 | 0.51 |
| Heptane | | | | | | | 0.22 | | |
| P-1 | | | | 90.0 | | | | | |
| P-2 | 90.0 | 90.0 | 90.0 | | 89.8 | 90.0 | 90.0 | 90.0 | |
| P-3 | | | | | | | | | 90.0 |
| Viscosity (cp) | 486 | 680 | 708 | 606 | 807 | 806 | 804 | 742 | 892 |

All the pastes in Examples 8 through 25 had a creamy smooth nature at the end of preparation. All the pastes were examined on a MPN printer (Model SP-200; semi-automatic) typically within one week of preparation. All the pastes were printable and rolled easily during printing, although overall printing performance characteristics, e.g., slump, feature definition, falling from the squeegee, consistency, etc., were not the same for each paste. All pastes exhibited fine pitch printing capability, i.e. about 10 to 20 mil pitch, and relatively low organic residues, ranging between 10% to 40%, by TGA analysis.

All the pastes of Examples 8 through 25 reflowed easily in the Vitronics IR unit with mild air purge. Typically, most of the pastes gave a dry residue, e.g., next to a 25 rail pitch 132 lead plastic leaded chip carrier (PLCC). Residue amounts and sometimes color of the residue varied.

EXAMPLE 26 AND COMPARATIVE EXAMPLE 2

Example 26 demonstrates a paste made with a compound of this invention for use in brazing applications and is compared to a brazing paste made with a vehicle conventional in the art. The compound of the invention was synthesized similar to Preparation 1 resulting in fully saturated poly(alpha-methylstyrene) indan (IAMS) having about 60% dimer and 40% trimer. The paste compositions were prepared as described above according to the following:

| Component | Example 26 | Comparative |
|---|---|---|
| Vehicle compound | IAMS | Ethyl Cellulose |
| Vehicle | 0.90 | 0.90 |
| Copper powder | 8.5 | 8.5 |
| $Cu_2O$ | 0.25 | 0.25 |
| Tungsten | 0.10 | 0.10 |
| $PbO_2$ | 0.08 | 0.08 |

-continued

| Component | Example 26 | Comparative |
|---|---|---|
| Frit | 0.17 | 0.17 |
| Tridecyl phosphate | 0.02 | — |
| % Vehicle | 9 | 9 |
| % inorganic particles | 91 | 91 |

The copper powder was spherical shaped particles with an average particle size of 3.5 microns. Average particle size for tungsten powder was 1 micron, for $Cu_2O$ and $PbO_2$ was about 1 to 2 microns, and the frit, lead borosilicate glass, was about 3 microns. The inorganic particles were prepared by ball milling then laboratory milling to the desired fine particle size range. Then, 9.1 g of the inorganic particles in the portions described in the table above, were mixed with 0.9 gm of the vehicle.

The pastes of Example 26 and of Comparative Example 2 were each printed on a standard adhesion pattern on a 1×1 inch alumina substrate. The paste of Example 26 printed well but required the addition of a surfactant, tridecyl phosphate, to wet out the powders. The paste of Example 26 had good carry back on printing, so that printing occurred when the squeegee returned in the opposite direction. Line definition printing was good when 5 mil lines and spaces were printed. The paste of Example 26 was slightly more tacky than the paste of Comparative Example 2, but the paste of Example 26 printed well at moderate printing speed of 5 in/sec.

The samples were dried at 125° C. for 10 minutes in air atmosphere in a forced air oven, manufactured by Blue M Co., (Malvern, Pa.). The samples were fired in a nitrogen atmosphere in a Lindberg 10 zone furnace, (made by Lindberg, Chicago, Ill.) with 60 minute profile, in which about 20 to 25 minutes was heating to firing temperature, firing occurred for 10 minutes at 900° C., and a controlled cool down was for the remainder of the cycle time. The samples were tested for performance in brazing applications and the results were as follows;

|  | Example 26 | Comparative Example 2 |
| --- | --- | --- |
| Dry thickness (μm) | 30 | 30 |
| Fired thickness | 21 | 21 |
| Resistivity (mΩ/sq/15 μm fired) | 2.0 | 2.0 |
| Solder acceptance | 97% | 99% |
| Solder leach | Excellent | Excellent |
| Initial adhesion (Newtons) | 27.9 | 29.0 |
| Adhesion (Newtons) (48 hr at 150° C.) | 26.0 | 25.2 |
| Adhesion (Newtons) (100 hr at 150° C.) | 25.5 | 23.9 |

The solder acceptance test was conducted by dipping the sample having 9 2×2 mm pads into a liquid solder bath containing 60% tin and 40% lead at 230° C. The number represents the percentage of pads on the substrate which were completely covered with solder. The solder leach test was conducted by immersion of a sample, 10 times for 10 second dips, in the liquid solder bath containing 60% tin and 40% lead at 230° C. Both the Example and the Comparative pastes showed excellent leaching resistance to the solder since there was no reduction in the size and shape of the copper pads and lines. Adhesion tests were conducted with an Instron machine, (Instron Corp., Canton, Mass.) on sample having a solder wire attached to a pad. The number represents the force necessary to peel the pad from the substrate. Samples were aged as indicated in the above table and were tested again.

Example 26 paste compared favorably to Comparable Example 2 paste. The copper film resulting from Example 26 paste was bright, conductive and adherent to the substrate indicating good burnout of the vehicle during firing.

The results indicated that the vehicle of this invention is suitable for use in brazing applications and offers burnout advantages over conventional vehicles.

EXAMPLES 27 AND 28 AND COMPARATIVE EXAMPLE 3

Examples 27 and 28 demonstrate that compounds of the present invention are useful in wave solder flux applications where the compounds of the invention are used as an additive or principal carrier in a flux.

Solder dip tests which simulate conventional wave solder processes were performed using a test printed wiring board having a Vacrel ® 8000 solder mask covering (sold by DuPont, Wilmington, Del.). The boards had a hot air solder level application of 63% Sn/37% Pb before the simulated wave solder experiments were performed. The procedure followed for the solder dip test was; the flux was applied to the sample board by brush; the sample was held for 5 to 10 seconds above a solder pot maintained at a temperature 240°±2° C.; the sample was immersed vertically and held in the pot for 2 to 5 seconds; and the sample board was removed and the results were observed.

| Sample | Flux Composition | Observations |
| --- | --- | --- |
| Control | none | poor solder wetting; and much |

| Sample | Flux Composition | Observations |
| --- | --- | --- |
|  |  | solder webbing |
| Comparative Example 3 | 3% adipic acid in isopropanol | good solder wetting; dry surface; many solder balls |
| Example 27 | 3% adipic acid in t-butylated IAMS (58% dimer of IAMS; 36.4% mono-substituted dimer; 4.5% di-substituted dimer) | good solder wetting; liquid residue with very few solder balls |
| Example 28 | 3% adipic acid in 47.5% isopropanol and 47.5% of the compound mixture in Example 3 | good solder wetting; dry surface, with very few solder balls |

The carrier used in Comparative Example 3 was isopropanol which is a conventional solvent carrier. Adipic acid is a conventional activator used in wave soldering fluxes in conjunction with isopropanol.

Based on visual and/or microscopic examination, replacing some of the conventionally used isopropanol with a compound of the present invention can lead to similar soldering performance but with much fewer solder balls.

What is claimed is:

1. An electronic paste composition comprising:

a) inorganic particles and b) a vehicle containing at least one compound having a molecular weight of about 200 to about 500 of the structure,

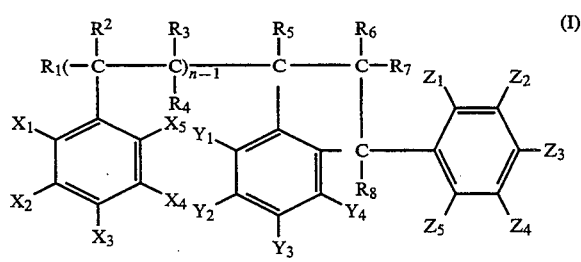

(I)

or the structure,

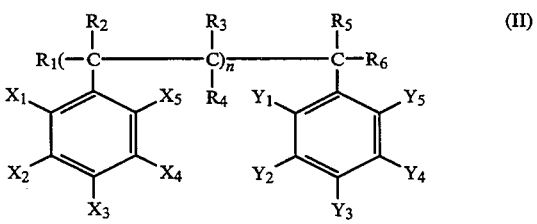

(II)

or the structure,

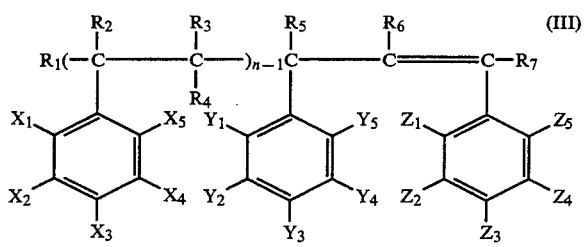

or the structure,

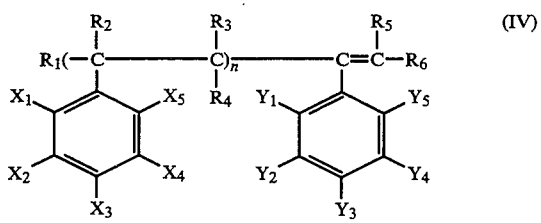

where

R$_1$ through R$_8$, are independently selected from the group consisting of hydrogen, phenyl, alkyl containing 1 to 10 carbon atoms, and cycloalkyl containing 5 to 10 carbon atoms, with the proviso that at least one of R$_1$ and R$_2$ is different than hydrogen and at least one of R$_3$ and R$_4$ is hydrogen;

X$_1$ through X$_5$, Y$_1$ through Y$_5$, Z$_1$ through Z$_5$, are independently selected from the group consisting of hydrogen, phenyl, alkyl, cycloalkyl, acyl, alkoxyl, carboxyl, carboxyl ester, and hydroxyl; and wherein said group each contains 10 or fewer carbon atoms; and n is 1 or 2.

2. The composition of claim 1 wherein one of X$_1$ through X$_5$, one of Y$_1$ through Y$_5$, and one of Z$_1$ through Z$_5$ are independently selected from the group consisting of phenyl, alkyl, cycloalkyl, acyl, alkoxyl, carboxyl, carboxyl ester, and hydroxyl; and wherein the remaining X$_1$ through X$_5$, Y$_1$ through Y$_5$, and Z$_1$ through Z$_5$ are each hydrogen.

3. Composition of claim 1 wherein the vehicle comprises a mixture of;

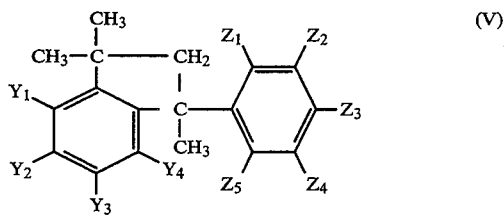

and

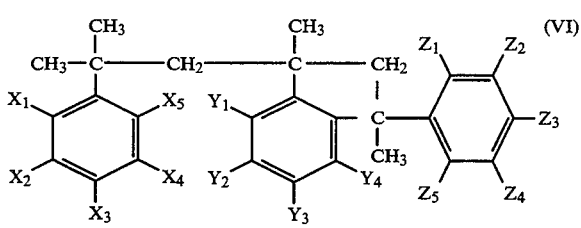

4. The electronic paste composition of claim 3 wherein X$_1$ through X$_5$, Y$_1$ through Y$_5$, and Z$_1$ through Z$_5$, the same or different, are substituents selected from the group consisting of hydrogen, alkyl and acyl; and wherein said substituents each contain 5 or fewer carbon atoms.

5. The electronic paste composition of claim 4 wherein X$_1$ through X$_5$, Y$_1$ through Y$_5$, Z$_1$ through Z$_5$, the same or different, are substituents selected from the group consisting of hydrogen, t-butyl, and acetyl.

6. The electronic paste composition of claim 1 wherein the inorganic particles comprise 65 to 95 weight percent of the paste and wherein the vehicle comprises 5 to 35 weight percent of the paste.

7. The electronic paste composition of claim 6 wherein the inorganic particles comprise 89 to 92 weight percent of the paste and wherein the vehicle comprises 8 to 11 weight percent of the paste.

8. The electronic paste composition of claim 1 wherein the inorganic particles comprise 65 to 95 weight percent of the paste and wherein said compound or compounds comprise about 5 to about 35 weight percent of the paste.

9. The electronic paste composition of claim 8 wherein the inorganic particles comprise 89 to 94 weight percent of the paste and wherein said compound or compounds comprise about 6 to about 11 weight percent of the paste.

10. The composition of claim 3 wherein the formulation comprises:

35 to 45% on a weight basis of the compound of structure VI; and, 55 to 65% on a weight basis of the compound of structure V, wherein X$_1$ through X$_5$, Y$_1$ through Y$_5$, Z$_1$ through Z$_5$ are hydrogen.

11. The composition of claim 3 wherein the formulation comprises:

75 to 100% on a weight basis of the compound of structure V; and, 0 to 25% on a weight basis of the compound of structure VI, wherein X$_1$ through X$_5$, Y$_1$ through Y$_5$, Z$_1$ through Z$_5$ are independently selected from the group consisting of hydrogen and t-butyl, with the proviso that at least one of X$_1$ through X$_5$, Y$_1$ through Y$_5$, Z$_1$ through Z$_5$ is t-butyl.

12. The composition of claim 3 wherein the formulation comprises:

75 to 100% on a weight basis of the compound of structure V; and, 0 to 25% on a weight basis of the compound of structure VI, wherein X$_1$ through X$_5$, Y$_1$ through Y$_5$, Z$_1$ through Z$_5$ are independently selected from the group consisting of hydrogen and acetyl, with the proviso that at least one of X$_1$ through X$_5$, Y$_1$ through Y$_5$, Z$_1$ through Z$_5$ is acetyl.

13. The electronic paste composition of claim 1 wherein the vehicle further comprises an activator.

14. The electronic paste composition of claim 13 wherein the activator is selected from the group consisting of substituted malonic acids, unsubstituted malonic acids, alkanolamine and mixtures thereof.

15. The electronic paste composition of claim 1 wherein the inorganic particles are selected from the group consisting of tin, lead, silver, indium, bismuth, and mixtures thereof.

16. The composition of claim 1 wherein the vehicle further comprises a rheological modifying agent selected from the group consisting of castor oil, hydrogenated castor oil, rosin, hydrogenated rosin, and mixtures thereof.

17. The composition of claim 1 wherein the vehicle further comprises a solvent selected from the group consisting of alcohols, ketones, hydrocarbons and esters.

* * * * *